United States Patent
Wu

(10) Patent No.: US 11,207,727 B2
(45) Date of Patent: Dec. 28, 2021

(54) ELECTRICALLY-DRIVEN RIVET NUT TOOL HAVING MULTI-STAGE STROKE AND PULL-RIVETING FORCE ADJUSTMENT

(71) Applicants: Shanghai Anzi Industrial Co., Ltd., Shanghai (CN); Shanghai Well-Done Machinery Manufacturing Co., Ltd., Shanghai (CN)

(72) Inventor: Mingxiang Wu, Shanghai (CN)

(73) Assignees: SHANGHAI ANZI INDUSTRIAL CO., LTD., Shanghai (CN); SHANGHAI WELL-DONE MACHINERY MANUFACTURING CO., LTD., Shanghai (CN)

(*) Notice: Subject to any disclaimer, the term of this patent is extended or adjusted under 35 U.S.C. 154(b) by 173 days.

(21) Appl. No.: 16/654,145

(22) Filed: Oct. 16, 2019

(65) Prior Publication Data
US 2020/0122224 A1    Apr. 23, 2020

(30) Foreign Application Priority Data
Oct. 18, 2018 (CN) .......................... 201811216864.1

(51) Int. Cl.
*B21J 15/28* (2006.01)
*B21J 15/26* (2006.01)
(Continued)

(52) U.S. Cl.
CPC ............... *B21J 15/28* (2013.01); *B21J 15/26* (2013.01); *B21J 15/50* (2013.01); *F16B 37/062* (2013.01); *F16B 37/08* (2013.01)

(58) Field of Classification Search
CPC ........ A01G 25/02; A01G 25/09; A01G 25/00; F16L 23/125; F16L 58/02; F16L 58/04; F16L 58/187; F16L 23/08; F16L 23/032; F16L 3/1016; Y10T 137/8593; Y10T 29/494
See application file for complete search history.

(56) References Cited

U.S. PATENT DOCUMENTS 2,766,996 A * 10/1956 Jacoby ................... A01G 25/09
                                                        285/5
2,892,466 A *  6/1959 Stilwell ................... F16L 55/00
                                                        239/737

(Continued)

*Primary Examiner* — Rick K Chang
(74) *Attorney, Agent, or Firm* — Ware, Fressola, Maguire & Barber LLP

(57) ABSTRACT

A rivet nut tool has a primary gear driven by a motor and a gear assembly coupled to the primary gear for rotation for moving a pull screw by a movement distance to achieve a stroke. The tool has a selection button for selecting a stroke value and a pull-riveting force. A control processor receives the selected stroke value and pull-riveting force. A count sensor is used to measure the rotational movement of a primary gear in terms of signal counts for determining the stroke achieved by the pull screw. The selected stroke value is presentable as a preset count value. When the signal count reaches the preset count value, or the motor current exceeds the current needed for the selected pull-riveting force, the control processor is configured to reverse the rotation direction of the motor so as to return the pull screw to its start position.

13 Claims, 2 Drawing Sheets

(51) Int. Cl.
 *B21J 15/50* (2006.01)
 *F16B 37/06* (2006.01)
 *F16B 37/08* (2006.01)

(56) References Cited

U.S. PATENT DOCUMENTS

| | | | | | |
|---|---|---|---|---|---|
| 2,896,858 | A | * | 7/1959 | Joels | A01G 25/09 239/726 |
| 2,990,121 | A | * | 6/1961 | Fischer | A01G 25/09 239/732 |
| 3,057,559 | A | * | 10/1962 | Ingram | A01G 25/09 239/732 |
| 3,164,360 | A | * | 1/1965 | Stafford | A01G 25/00 251/146 |
| 3,179,340 | A | * | 4/1965 | Brooks | A01G 25/09 239/741 |
| 3,217,737 | A | * | 11/1965 | Jensen | A01G 25/09 239/741 |
| 3,324,876 | A | * | 6/1967 | Cecil | A01G 25/09 239/732 |
| RE26,285 | E | * | 10/1967 | Stafford | A01G 25/09 239/735 |
| 3,516,609 | A | * | 6/1970 | Gheen | A01G 25/09 239/734 |
| 3,528,634 | A | * | 9/1970 | Jenkins | F16L 3/16 248/70 |
| 3,807,585 | A | * | 4/1974 | Holzmann | B60P 3/41 414/529 |
| 3,807,638 | A | * | 4/1974 | Clements | A01G 25/09 239/734 |
| 3,856,039 | A | * | 12/1974 | Courtright | B05B 15/60 239/741 |
| 3,870,235 | A | * | 3/1975 | Newell | A01G 25/09 239/728 |
| 3,976,093 | A | * | 8/1976 | Cornelius | A01G 25/09 239/741 |
| 4,076,039 | A | * | 2/1978 | Hartsock | A01G 25/09 239/737 |
| 4,135,738 | A | * | 1/1979 | Clements | F16L 27/087 239/734 |
| 7,407,182 | B2 | * | 8/2008 | Aoki | B60R 21/201 280/728.1 |
| 8,882,006 | B2 | * | 11/2014 | Korus | A01G 25/097 239/732 |
| 8,998,162 | B1 | * | 4/2015 | Gutha | A01G 25/09 248/545 |

* cited by examiner

ELECTRICALLY-DRIVEN RIVET NUT TOOL HAVING MULTI-STAGE STROKE AND PULL-RIVETING FORCE ADJUSTMENT

CROSS REFERENCE TO RELATED PATENT APPLICATION

This application claims benefit to Chinese Patent Application No. 201811216864.1, filed Oct. 18, 2018, which is hereby incorporated by reference in its entirety.

TECHNICAL FIELD OF THE INVENTION

The present invention relates to a riveting tool and, in particular, to an electrically-driven rivet nut tool having multi-stage stroke and pull-riveting force adjustment.

BACKGROUND OF THE INVENTION

For common electrically-driven rivet nut tools, the operating stroke is fixed. However, in the practical riveting operations, not all riveting strokes are required to be the same length. In some riveting operations, only half of the stroke or shorter is desired. In this case, generally, the excessive idle stroke beyond the operating stroke is achieved by mechanical adjustment. The stroke, when exceeding the actual need too much, will affect the operating efficiency, waste the electrical energy, and shorten the service life of the riveting tool. In addition, the rivet nuts of different specifications are vastly different in the required riveting force. An excessive riveting force could damage rivet nuts, and the electrical energy could also be wasted. Those defects need to be improved.

SUMMARY OF THE INVENTION

According to embodiments of the present invention, an electrically-driven rivet nut tool has a multi-stage stroke and pull-riveting force adjustment. The rivet nut tool has a primary gear driven by a motor, a control processor configured to control the motor, a plurality of sensor blocks disposed on a gear surface of the primary gear, a count sensor disposed in relationship to the gear surface to provide a sensing signal to the control sensor. The rivet nut tool comprises a pull screw coupled to the motor to provide a stroke. The rivet nut tool further comprises a selection button for selecting a stroke value and a pull-riveting force value to provide to the control processor. The count sensor is arranged to convey a number of signals indicative of the rotation of the sensing blocks along with the rotation of gear surface to the control processor in real time. The control processor compares the number of signals with a preset count value for the preset stroke. When the number of signals reaches the preset count value, the motor is caused to rotate backward to return the pull screw to the original position. The control processor is configured to provide an electric current to the motor based on the selected pull-riveting force. The electrical current is also sensed or measured by the control processor in real time. If the real-time current value exceeds a preset current value, the motor is caused to rotate backward to return the pull screw to the original position One triggering of the count sensor is considered as one count unit of the stroke, the sensing blocks trigger the count sensor, the count sensor accumulates the count units and transmits the accumulated count value to the control processor, and the processor converts the count value to the stroke value.

The sensing blocks are fixed in grooves formed on a surface of the primary gear.

Thus, the first aspect of the present invention is to provide a rivet nut tool, comprising:
a pull screw arranged to mount a rivet nut;
a primary gear;
a motor arranged to drive the primary gear;
a gear assembly coupled to the primary gear for rotational movement, the gear assembly configured to move the pull screw by a movement distance in a predetermined direction from a start position to achieve a stroke based on an amount of rotational movement of the primary gear;
a control processor configured to control the motor;
a selection module arranged for selection of a stroke length and to provide an indication to the control processor indicating a selected stroke length;
a sensor assembly configured to measure the amount of rotational movement of the primary gear, the sensor assembly arranged to provide an electronic signal to the control processor indicative of a measured rotational amount, wherein the control processor is arranged to control the movement distance of the pull screw based on the selected stroke length and the measured rotational amount.

According to an embodiment of the present invention, the selection module is further arranged for selection of a pull-riveting force of the rivet nut tool, and the indication to the control processor is also indicative of a selected pull-riveting force so as to control an electrical current provided to the motor.

According to an embodiment of the present invention, the sensor assembly comprises at least a signal transmitter disposed on the primary gear, and a signal receiver disposed in relationship to said at least a signal transmitter configured to provide the electronic signal.

According to an embodiment of the present invention, the primary gear comprises a rotational axis and a gear surface substantially perpendicular to the rotational axis, and wherein the sensor assembly comprises a plurality of sensor blocks disposed on a gear surface of the primary gear, and a sensing device disposed in relationship to the gear surface arranged to provide a count signal indicative of the electronic signal when the sensing device is in proximity of one of the sensor blocks.

According to an embodiment of the present invention, the control processor is configured to compare the selected stroke length to the movement distance of the pull screw based on the measured amount of rotational movement of the primary gear such that when the movement distance of the pull screw reaches the selected stroke length, the motor is caused to move the pull screw to the start position of the pull screw.

According to an embodiment of the present invention, the selected stroke length is 2 mm, 4 mm, 6 mm or 8 mm.

According to an embodiment of the present invention, each count signal is indicative of the movement distance of $1/12$ mm by the pull screw.

According to an embodiment of the present invention, the gear surface comprises a circular groove for disposing the plurality of sensor blocks, and wherein the plurality of sensor blocks range from 2 to 4.

According to an embodiment of the present invention, the selected pull-riveting force is 16000 N or 24000 and the electrical current provided to the motor is 20 A or 30 A.

The second aspect of the present invention is a method for controlling a rivet nut tool, the rivet nut tool comprising:
a pull screw arranged to mount a rivet nut;
a primary gear;
a motor arranged to drive the primary gear;
a gear assembly coupled to the primary gear for rotational movement, the gear assembly configured to move the pull screw by a movement distance from a start position in a predetermined direction to achieve a stroke based on an amount of rotational movement of the primary gear, said method comprising: providing a control processor, the control processor configured to control the motor;
providing a selection module arranged for selection of a stroke length and to provide an indication to the control processor indicating a selected stroke length, providing a sensor assembly configured to measure the amount of rotational movement of the primary gear;
arranging the sensing assembly to provide an electronic signal to the control processor indicative of a measured rotational amount, wherein the control processor is arranged to control the movement distance of the pull screw based on the selected stroke length.

According to the present invention, the primary gear comprises a rotational axis and a gear surface substantially perpendicular to the rotational axis, and wherein the sensor assembly comprises a plurality of sensor blocks disposed on gear surface of the primary gear, and a sensing device disposed in relationship to the gear surface arranged to provide a count signal indicative of the electronic signal when the sensing device is in proximity of one of the sensor blocks.

According to the present invention, the selected stroke length is presentable by a preset count value, and when a number of count signals indicative in the electronic reaches the preset count value, the control processor is configured to reverse rotation of the motor so as to return the pull screw to the start position.

According to the present invention, the selection module is further arranged for selection of a pull-riveting force and the indication to the control processor is also indicative to a selected pull-riveting force so as to control an electrical current provided to the motor.

The present invention will become more apparent upon reading the detail description in conjunction with the following drawing figures.

BRIEF DESCRIPTION OF THE DRAWINGS

The accompanying drawings constituting a part of the present application are used for providing further understanding of the present invention.

In FIG. 1, the drawn elements are as following:
1: pull screw;
2: primary gear;
3: sensing block;
4: count sensor;
5: control processor;
6: stroke/pull-riveting force display panel;
7: stroke indicator;
8: pull-riveting force indicator;
9: stroke/pull-riveting force selection button;
10: start button;
11: motor;
12: ball nut assembly;
13: coupling gear;
14: gear surface;
15: motor gear; and
100: rivet nut tool.

DETAILED DESCRIPTION OF THE INVENTION

The embodiments of the present invention are described below in detail with reference to the accompanying drawings.

Figure 1:
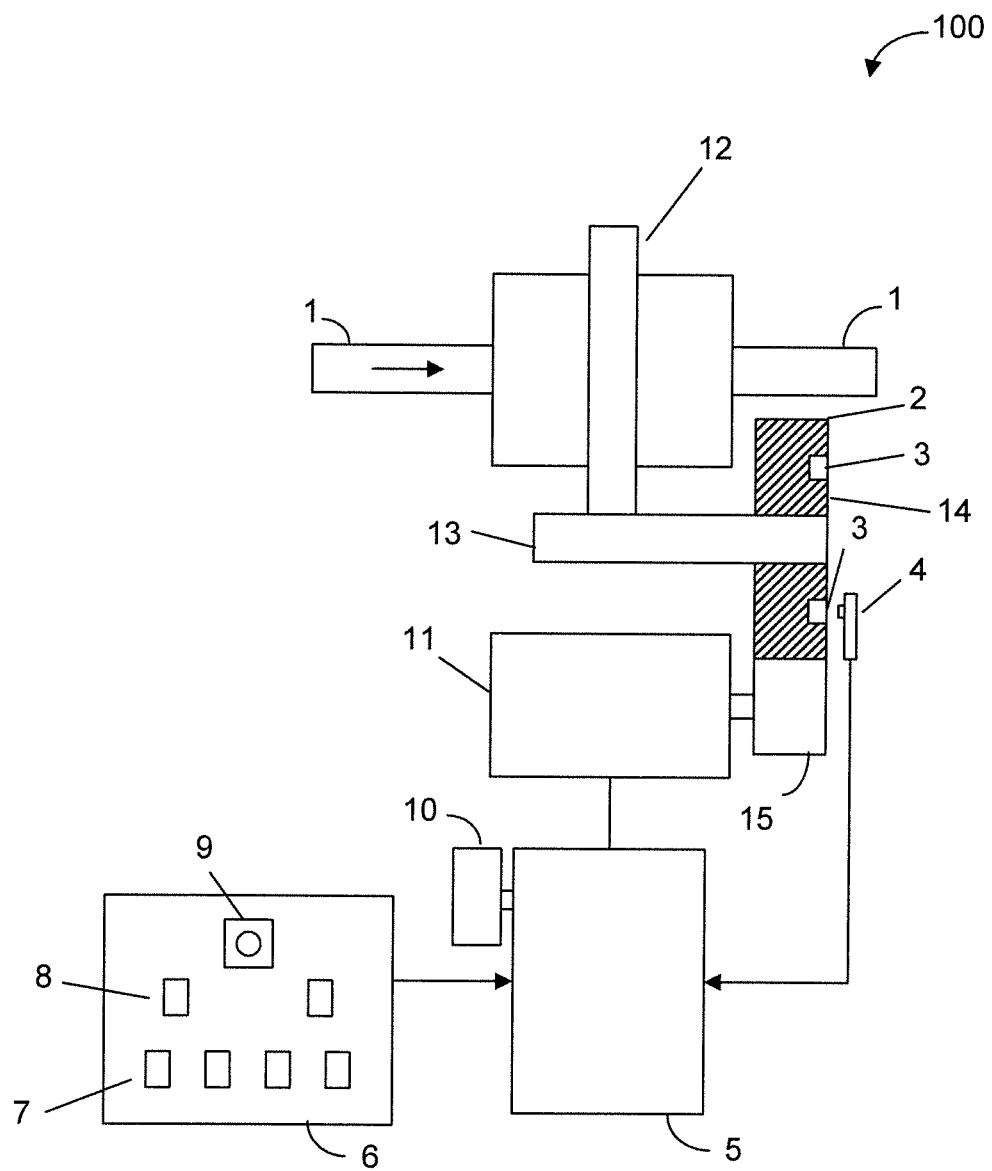
FIG. 1 is a schematic structure diagram of the rivet nut tool, according to an embodiment of the present invention.

As shown in FIG. 1, the present invention provides an electrically-driven rivet nut tool 100 having a multi-stage stroke and pull-riveting force adjustment. The rivet nut tool has a selection button 9 for selecting a stroke value from multiple values of 2 mm, 4 mm, 6 mm and 8 mm, and a pull-riveting force value from 16000 N and 24000 N. A control processor 5 receives the input selected stroke value and pull-riveting force value. An extension plate is provided in a housing of the rivet nut tool, and a count sensor 4 is mounted on the extension plate. The count sensor 4 is positioned in relationship to sensing blocks 3 on a primary gear 2 and is connected to the control processor 5.

The stroke value in each selection corresponds to a preset count value in the control processor 5. According to an embodiment of the present invention, the preset count value corresponding to the stroke value of 2 mm is 24, the preset count value corresponding to the stroke value of 4 mm is 48, the preset count value corresponding to the stroke value of 6 mm is 72, and the preset count value corresponding to the stroke value of 8 mm is 96. The count sensor 4 is triggered by the rotation of the sensing blocks 3 along with the rotation of gear surface 14, and the control processor 5 compares the number of signals transmitted by the count sensor 4 with the preset count value for the selected stroke. When a start button 10 of the rivet nut tool is pressed, a motor 11 is activated to move forward, and a pull screw 1 moves in a direction indicated by the arrow shown in FIG. 1. When the number of signals transmitted by the count sensor 4 reaches the preset count value for the selected stroke, the control processor 5 changes the direction of current supplied to the motor 11, so that the motor 11 rotates reversely and the pull screw 11 returns to the original position.

As seen in FIG. 1, the primary gear 2 is driven by the motor 11 via motor gear 15.

The pull screw 1 is moved by a ball nut assembly 12 to achieve a stroke. The ball nut assembly 12 is coupled to the primary gear 2 via a coupling gear 13 for rotation.

According to an embodiment of the present invention, the pull-riveting force of 16000 N and the pull-riveting force of 24000 N correspond to two preset current values (i.e., 20 A and 30 A) in the control processor 5, respectively. When the start button 10 of the rivet nut tool is pressed down, the motor 11 is activated to rotate forward, and the pull screw 1 moves in the direction indicated by the arrow shown in FIG. 1. When the current value measured by the control processor 5 is greater than the preset current value for the selected pull-riveting force, the control processor 5 changes the direction of current supplied to the motor, so that the motor 11 rotates reversely and the pull screw 11 returns to the original position.

One triggering of the count sensor 4 is considered as one count unit of the stroke. The sensing blocks 3 trigger the count sensor 4. The count sensor 4 accumulates the count units and transmits the accumulated count value to the control processor 5. The control processor 5 compares the received count value with the preset count value to determine whether the selected stroke value is reached.

The sensing blocks 3 are fixed in grooves formed on the gear surface 14 of the primary large gear 2. In order to improve the accuracy of detection, there are two to five sensing blocks 3. The distance from the center of each sensing block 3 to the center of the primary large gear 2 is equal, and the sensing blocks 3 are uniformly distributed in the circumferential direction.

Figure 2:
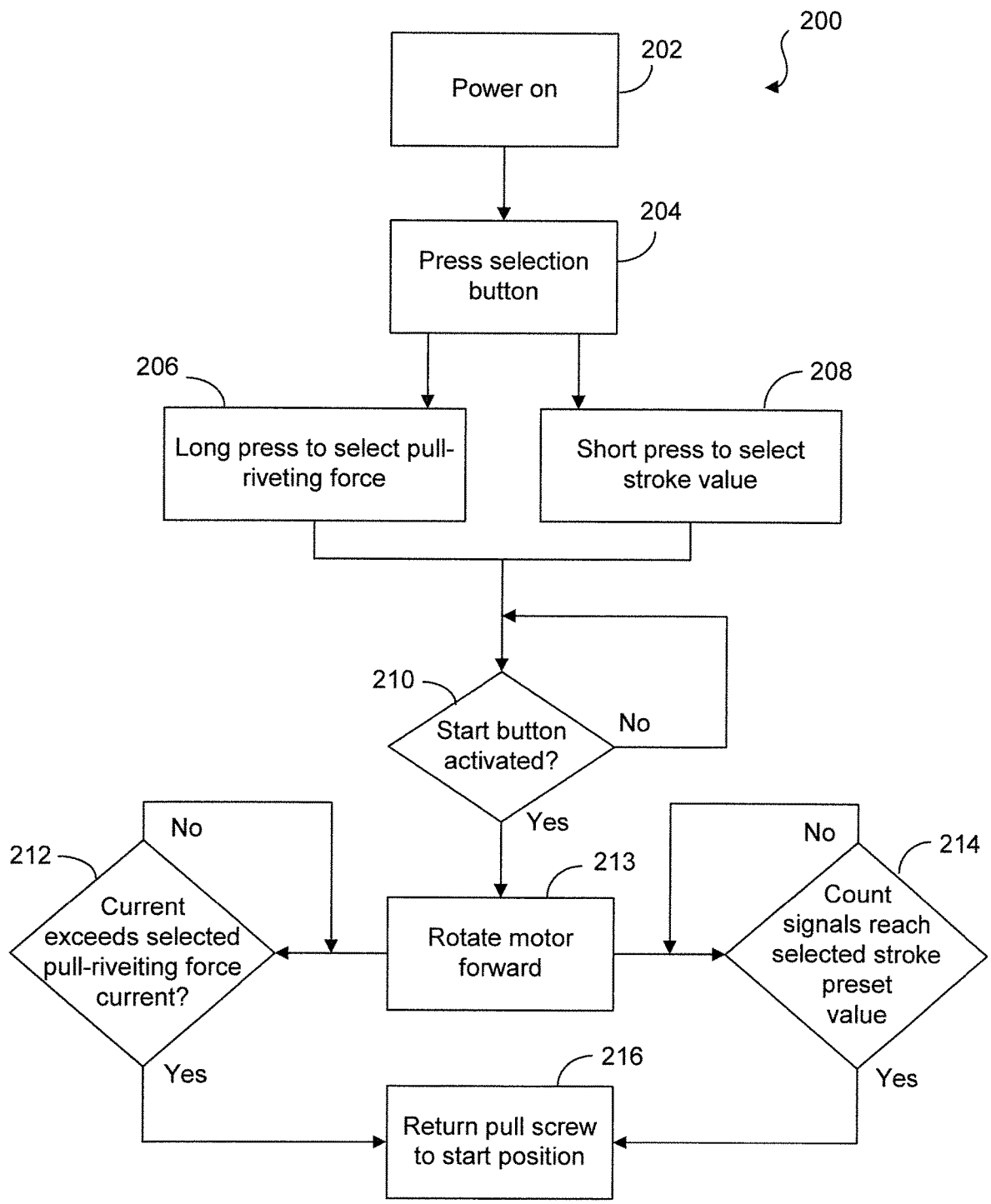
FIG. 2 is a flowchart showing a method of controlling the rivet nut tool, according to an embodiment of the present invention.

FIG. 2 is a flowchart showing a method for controlling the rivet nut tool, according to the present invention. As shown in the flowchart 200, the power is turned on at step 202. At step 204, the selection button is pressed. A long press indicated at step 206 is arranged to select a pull-riveting force and a short press indicated at step 208 is arranged to select a stroke length or value. As determined at step 210, if the start button is activated, the motor is rotated to move the pull screw at step 213. As determined at step 212, if the electrical current provided to the motor exceeds the preset current value for the selected pull-riveting force, the motor is caused to rotate reversely to return the pull screw to its original or start position at step 216. As determined at step 214, if the count signals provided by the count sensor reach the preset count value for the selected stroke, the motor is caused to rotate reversely to return the pull screw to its original position at step 216.

The foregoing description merely shows some embodiments of the present invention. Various modifications and variations can be made to the present invention by a person of ordinary skill in the art. Any modifications, equivalent replacements and improvements made without departing from the principle of the present invention shall fall into the protection scope of the present invention.

What is claimed is:

1. A rivet nut tool, comprising:
   a pull screw arranged to mount a rivet nut;
   a primary gear;
   a motor arranged to drive the primary gear;
   a gear assembly coupled to the primary gear for rotational movement, the gear assembly configured to move the pull screw by a movement distance in a predetermined direction from a start position to achieve a stroke based on an amount of rotational movement of the primary gear;
   a control processor configured to control the motor;
   a selection module arranged for selection of a stroke length and to provide an indication to the control processor indicating a selected stroke length;
   a sensor assembly configured to measure the amount of rotational movement of the primary gear, the sensor assembly arranged to provide an electronic signal to the control processor indicative of a measured rotational amount, wherein the control processor is arranged to control the movement distance of the pull screw based on the selected stroke length and the measured rotational amount.

2. The rivet nut tool according to claim 1, wherein the selection module is further arranged for selection of a pull-riveting force of the rivet nut tool, and the indication to the control processor is also indicative of a selected pull-riveting force so as to control an electrical current provided to the motor.

3. The rivet nut tool according to claim 1, wherein the sensor assembly comprises at least one signal transmitter disposed on the primary gear, and one signal receiver disposed in relationship to said at least one signal transmitter configure to provide the electronic signal.

4. The rivet nut tool according to claim 1, wherein the primary gear comprises a rotational axis, and a gear surface substantially perpendicular to the rotational axis, and wherein the sensor assembly comprises a plurality of sensor blocks disposed on the gear surface of the primary gear, and a sensing device disposed in relationship to the gear surface arranged to provide a count signal indicative of the electronic signal when the sensing device is in proximity to one of the sensor blocks.

5. The rivet nut tool according to claim 1, wherein the control processor is configured to compare the selected stroke length to the movement distance of the pull screw based on the measured amount of rotational movement of the primary gear such that when the movement distance of the pull screw reaches the selected stroke length, the motor is caused to move the pull screw to the start position of the pull screw.

6. The rivet nut tool according to claim 1, wherein the selected stroke length is 2 mm, 4 mm, 6 mm or 8 mm.

7. The rivet nut tool according to claim 4, wherein the count signal is indicative of the movement distance of $\frac{1}{12}$ mm by the pull screw.

8. The rivet nut tool according to claim 4, wherein the gear surface comprises a circular groove for disposing the plurality of sensor blocks, and wherein the plurality of sensor blocks range from 2 to 4.

9. The rivet nut tool according to claim 2, wherein the selected pull-riveting force is 16000 N or 24000 and the electrical current provided to the motor is 20 A or 30 A.

10. A method for controlling a rivet nut tool, the rivet nut tool comprising:
    a pull screw arranged to mount a rivet nut;
    a primary gear;
    a motor arranged to drive the primary gear;
    a gear assembly coupled to the primary gear for rotational movement, the gear assembly configured to move the pull screw by a movement distance from a start position in a predetermined direction to achieve a stroke based on an amount of rotational movement of the primary gear, said method comprising:
    providing a control processor, the control processor configured to control the motor;
    providing a selection module arranged for selection of a stroke length and to provide an indication to the control processor indicating a selected stroke length, providing a sensor assembly configured to measure the amount of rotational movement of the primary gear;
    arranging the sensing assembly to provide an electronic signal to the control processor indicative of a measured rotational amount, wherein the control processor is arranged to control the movement distance of the pull screw based on the selected stroke length.

11. The method according to claim 10, wherein the primary gear comprises a rotational axis and a gear surface substantially perpendicular to the rotational axis, and wherein the sensor assembly comprises a plurality of sensor blocks disposed on the gear surface of the primary gear, and a sensing device disposed in relationship to the gear surface arranged to provide a count signal indicative of the electronic signal when the sensing device is in proximity to one of the sensor blocks.

12. The method according to claim 11, wherein the selected stroke length is presentable by a preset count value, and when a number of count signals indicative in the electronic signal reaches the preset count value, the control processor is configured to reverse rotation of the motor so as to return the pull screw to the start position.

13. The method according to claim 10, wherein the selection module is further arranged for selection of a pull-riveting force and the indication to the control processor is also indicative to a selected pull-riveting force so as to control an electrical current provided to the motor.

* * * * *